United States Patent [19]

Cerf

[11] Patent Number: 4,945,709
[45] Date of Patent: Aug. 7, 1990

[54] DEVICE AND METHOD FOR APPLYING A STATIC SEAL

[75] Inventor: Alain A. Cerf, Largo, Fla.

[73] Assignee: Polycerf, Inc., Largo, Fla.

[21] Appl. No.: 324,950

[22] Filed: Mar. 17, 1989

[51] Int. Cl.$^5$ .......................... B65B 9/06; B65B 51/26
[52] U.S. Cl. ........................................ 53/450; 53/141; 53/550
[58] Field of Search ................. 53/450, 550, 141, 371, 53/378, 374, 442, 545, 547; 156/273.1, 274.4, 274.6, 380.2, 380.1

[56] References Cited

U.S. PATENT DOCUMENTS

| | | | |
|---|---|---|---|
| 3,274,302 | 9/1966 | Anderson et al. | 53/442 X |
| 3,462,909 | 8/1969 | Anderson | 53/141 X |
| 4,419,855 | 12/1983 | Shanklin | 53/450 |
| 4,517,786 | 5/1985 | Barker | 53/450 |
| 4,761,937 | 8/1988 | Francioni | 53/550 |

Primary Examiner—James F. Coan
Attorney, Agent, or Firm—Joseph C. Mason, Jr.; Ronald E. Smith

[57] ABSTRACT

A static seal is applied to overlapping edges of film wrapped about a product. A hollow forming head forms the film into a generally tubular configuration so that longitudinally extending opposite edges of the film overlap. A first electrode is disposed within the tubular cavity defined by the film and bears downwardly upon the overlapped edges of the film as the film travels past the first electrode. A second electrode is positioned downwardly of the overlapped edges and outside the tubular cavity. A stream of electrons flowing across an air gap between the electrodes applies the electro static seal.

21 Claims, 6 Drawing Sheets

Fig. 8

DEVICE AND METHOD FOR APPLYING A STATIC SEAL

TECHNICAL FIELD

This invention relates, generally, to a device and method for applying a static seal to packages wrapped in film. More particularly, it relates to a device positioned within the tubular cavity defined by film exiting a hollow forming head of the type used in shrink wrap packaging machines.

BACKGROUND ART

Several types of packaging machines include hollow forming heads that form film into a generally open ended tubular shape so that a first longitudinally extending edge of the film overlies a second longitudinally extending edge thereof. The overlapping edges are then joined to one another by heat sealing or static sealing.

In static sealing, an electrical charge of a first polarity is applied to the first edge of the film, and a charge of opposite polarity is applied to the second edge so that the edges cling to one another as a result of electrostatic attraction.

The conventional means of forming the seal includes a first electrode member positioned outside the generally tubular cavity defined by the film as it exits the hollow forming head. The first electrode member includes an arm member having a return bend formed therein that reaches into the interior of the tubular cavity at the bottom thereof where the opposite longitudinally extending edges of the film are overlapped. A first longitudinally extending edge of the film is captured by the return bend part of the arm member; the arm member overlies the second longitudinally extending edge. A second electrode member is spaced downwardly from the first electrode member and a stream of electrons flows between the first and second electrodes and applies charges of opposite polarity to different ones of the overlapping edges so that said edges cling to one another due to electrostatic attraction.

The primary limitation of the prior art device and method resides within the restrictions imposed by the external positioning of the first electrode vis a vis the tubular cavity defined by the film. Since the first electrode is mounted externally to the tubular cavity, the arm member having a return bend formed therein must be provided. Thus, the transverse extent or depth of the return bend limits the amount of overlap that may be established between the opposite longitudinally extending edges of the film. Since the amount of overlap is limited, the strength of the static seal is limited, i.e., the less the amount of overlap between the oppositely charged edges, the less the strength of the electrostatic seal therebetween.

Moreover, the overlying or first longitudinally extending edge of the film will often be inserted too deeply into the return bend part of the arm member. The film, being very flexible, simply wrinkles and folds over on itself when so inserted. Thus, the strength of the electrostatic seal, already weak due to the limited extent of overlapping imposed by the return bend, is further attenuated by the wrinkled configuration of the overlying edge of the film.

A means and method for applying a static seal in the absence of an externally mounted electrode and its troublesome return bend is needed, but no such means or method appears in the prior art.

DISCLOSURE OF INVENTION

A shrink wrap packaging machine has a hollow forming head that shapes film fed from a roll into a generally tubular shape as product is carried on a conveyor belt through the forming head. The opposite, longitudinally extending edges of the film overlap at the bottom of the forming head and remain in overlapped relation as the film travels downstream from the forming head.

A first electrode member or anode is positioned within the tubular cavity formed by the film, just downstream from the forming head, in overlying and abutting relation to the overlapped edges of the film. A second electrode member or cathode is positioned externally of the tubular cavity, in downwardly spaced relation to the overlapped edges of the film. The second electrode is electrically coupled to a high voltage source of DC power and the anode is grounded; electrons flowing from the cathode to the anode apply a charge of a first polarity to the overlying edge of the overlapped edges and a charge of a second polarity to the underlying edge of the overlapped edges and the resulting electrostatic charges bind the overlapped edges to one another to thereby form a seal. The package is next transported through a heat tunnel where the film shrinks tightly around it to complete the wrapping of the package; the heat does not affect the electrostatic forces sealing the overlapped edges of the film together.

The novel anode is provided in the form of an elongate, metallic plate member of rectangular configuration and the cathode is of conventional placement and construction, i.e., it is positioned outside of the tubular cavity formed by the film, in downwardly spaced relation to the overlapped edges thereof; a conventional round shank nail having a sharp point makes a good cathode.

The nail or other suitable cathode means is coupled to a power source in a conventional manner and a potential difference sufficient to establish and maintain a continuous stream of electrons across the gap between the anode and cathode is applied across said electrodes in the well known manner.

Since the anode is positioned wholly within the tubular cavity formed by the film, the mounting means therefore is similarly situated. The anode is a flat metallic plate member having a longitudinal axis parallel to the longitudinal axis of the tubular cavity defined by the film. It is integral with a second flat rectangular mounting plate having a longitudinal axis transverse to the longitudinal axis of the anode. The mounting plate is positioned adjacent the trailing (downstream) edge of the forming head member that shapes the film into its tubular configuration. A first thin rod member is fixedly secured to a first end of the mounting plate member and extends in a longitudinal direction, i.e., the axis of the first rod is parallel to the longitudinal axis of the anode, the tubular cavity and the forming head. A right angle, outwardly turned bend is formed in the rod at the leading edge of the forming head member. Similarly, a second thin rod member is fixedly secured to a second, opposite end of said mounting plate member and extends in a longitudinal direction parallel to the first rod; a right angle, outwardly turned bend is also formed in it at the leading edge of the forming head. The purpose of both outwardly turned bends is to prevent forward (downstream) travel of the anode as packages are carried downstream relative to it, as will be clear when the drawings are reviewed in connection with the detailed description that follows. Thus, the anode, the transversely disposed mounting plate to which the anode is secured or integrally formed, and the longitudinally extending parts of the thin rod members that extend from opposite ends of the transversely disposed mounting plate are all disposed interiorly of the tubular cavity defined by the film, but only the longitudinally extending part of the rods are also disposed interiorly of the forming head. The film does not extend to the leading (upstream) end of the forming head, so the transversely disposed (outwardly extending) part of the rods are external to the tubular cavity and the forming head as well. The free ends of each rod member are releasably received within associated retention slots to bar downstream travel of the anode as earlier mentioned.

The anode presses downwardly on the flexible film as it passes thereunder; accordingly, the film is deflected downwardly. Since the film is wrapped about a package that is transported by a conveyor means, a pair of transversely spaced apart conveyor belt members are provided so that the deflected film and anode occupy the space between the belt members. The tension of each belt member is independently adjustable by novel belt tension adjusting means. Since there is very little friction between a light package, the film, and the moving belt, a means is needed to propel such packages in a forward (downstream) direction. Accordingly, a second or upper conveyor belt means is positioned in vertically spaced relation to the conveyor belt means upon which the packages lie as they are transported. The second belt overlies the top of the packages and propels them in the same direction as the lower belt. Since packages vary in height, means are provided to vertically adjust the upper conveyor belt.

It is therefore understood that the primary object of this invention is to provide a means and method for enhancing the static seal achieved on a film wrapped package.

The invention accordingly comprises the features of construction, combination of elements and arrangement of parts that will be exemplified in the descriptions set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

BEST MODES FOR CARRYING OUT THE INVENTION

Figures 1, 2, 3:
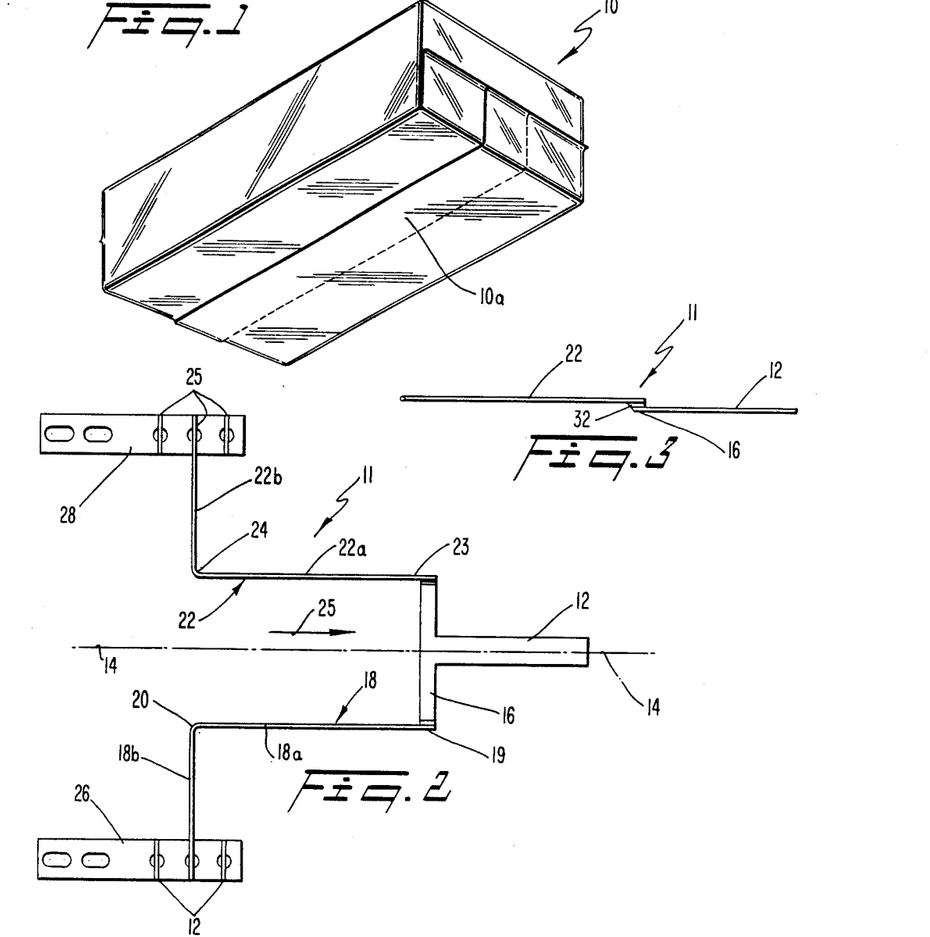
FIG. 1 is a perspective view of a package wrapped in film having the improved static seal made possible by this invention.
FIG. 2 is a plan view of the novel anode means and its mounting members.
FIG. 3 is a side elevational view of the anode and part of its mounting means.

FIG. 1 depicts a package 10 wrapped in film. A static seal 10a is formed along the bottom thereof as shown where the opposite longitudinally extending edges of the film overlap. The amount of overlap depicted is about two inches. The amount of overlap achievable through use of prior art structures is restricted to about one-half inch; the novel anode and its related parts enable the large overlap to be provided, and also eliminate the wrinkled, ineffective seals produced by prior art devices.

The anode and the parts to which it is mounted are denoted as a whole in FIG. 2 by the reference numeral 11. The parts collectively denoted 11 form the static seal station of this invention. Anode 12 is a flat metallic plate of rectangular configuration and has a longitudinal axis of symmetry 14. The proximal end of anode 12 is fixedly secured or integrally formed with a second flat metallic plate 16 that is disposed transverse to axis 14.

A first thin elongate rod member 18 has a first end thereof fixedly secured to a first end of mounting plate 16 as at 19; a first part 18a of rod 18 extends parallel to axis 14 and a second part 18b thereof extends in a direction transverse thereto. The rod has a 90 degree bend 20 formed therein at a location determined by the size of the forming head of the packaging machine as will become more clear as this description proceeds.

A second thin elongate rod member 22 has a first end thereof fixedly secured to a second end of mounting plate 16 as at 23; a first part 22a of rod 22 extends parallel to axis 14 and a second part 22b thereof extends in a transverse direction thereto. A ninety degree bend is formed in rod 22 as at 24.

When the anode and its mounting members 11 are installed on a packaging machine, they are disposed in a generally horizontal plane. Longitudinally extending parts 18a and 22a of thin rod members 18 and 22, respectively, are disposed within the square tunnel-like forming head of the machine and are disposed interiorly of the tubular cavity defined by the film that is shaped by the forming head. Transversely extending parts 18b and 22b of the rods are not disposed internally of the forming head or the film; bends 20, 24 abuttingly engage the leading (upstream) edges of the vertical sidewalls of the forming head to prevent downstream travel of the anode 12, it being understood that product travels in the direction indicated by directional arrow 25.

As will become increasingly clear, product travelling in the direction of arrow 25 passes through a forming head and is wrapped in a flexible plastic film such as polypropylene, polyethylene, or other suitable material.

The film takes a generally tubular form as it is wrapped around the product, i.e., the film initially wraps around the top, bottom and sides of the product and the ends of the generally tubular package thereby formed are not sealed until after the package has exited the static sealing station 11.

The opposite edges of the tubular film overlap, i.e., a first edge region of the film overlies a second edge region thereof when the film has taken its generally tubular form around the top, bottom and sidewalls of a product. The overlap is provided at the bottom of the product being wrapped, i.e., the opposite edges of the film overlap at the bottom of the tubular cavity defined by the film. It should therefore be understood that all of the parts 11 of the static sealing station are positioned in a plane generally coincident with the plane defined by the bottom of the package being wrapped, i.e., anode 12 rides atop the overlapped edges of the film as the machine operates. Anode 12 and transverse mounting plate 16 are disposed external to the forming head, but are disposed internally of the tubular cavity defined by the film.

FIG. 2 also shows that the transversely extending parts 18b, 22b of elongate rod members 18, 22 are respectively slidably received within a preselected slot, collectively denoted 21, 25 formed in mounting members 26, 28 respectively; said mounting members are secured to the frame of the packaging machine by suitable means. Accordingly, the position of the static seal station 11 is easily adjustable as required by different sized forming heads.

Figure 4:
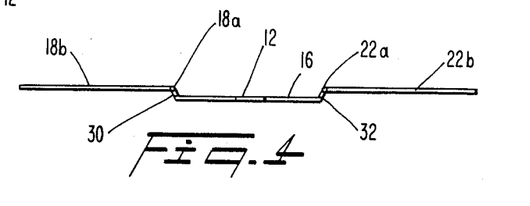
FIG. 4 is a front elevational view of the anode and part of its mounting means.

FIG. 3 reveals that anode 12 and plate 16 are vertically offset from the plane of rod members 18 and 22. As best shown in FIG. 4, truncate connector members 30, 32 are employed to achieve the desired offsetting. The vertical offset is provided because, as perhaps best understood in connection with FIG. 4, since longitudinally extending parts 18a, 22a of rod members 18, 22 respectively, are inside the tubular cavity defined by the film, which film is inside the hollow forming head, and since anode 12 and mounting plate 16 are also inside the tubular cavity defined by the film but are outside the forming head, and since the packages being wrapped are supported by the bottom of the forming head, if the offset were not provided, the bottom of a package could engage mounting plate 16 were it not offset vertically downward as shown. Moreover, the offset enables anode 12 to bear against the overlapped parts of the seal; as will be shown hereinafter, the film, at the point of overlap, is displaced downwardly by anode 12 when it encounters said anode. This serves to provide a better static seal when electrons flow between the anode and a cathode positioned downwardly of anode 12.

Figure 5:
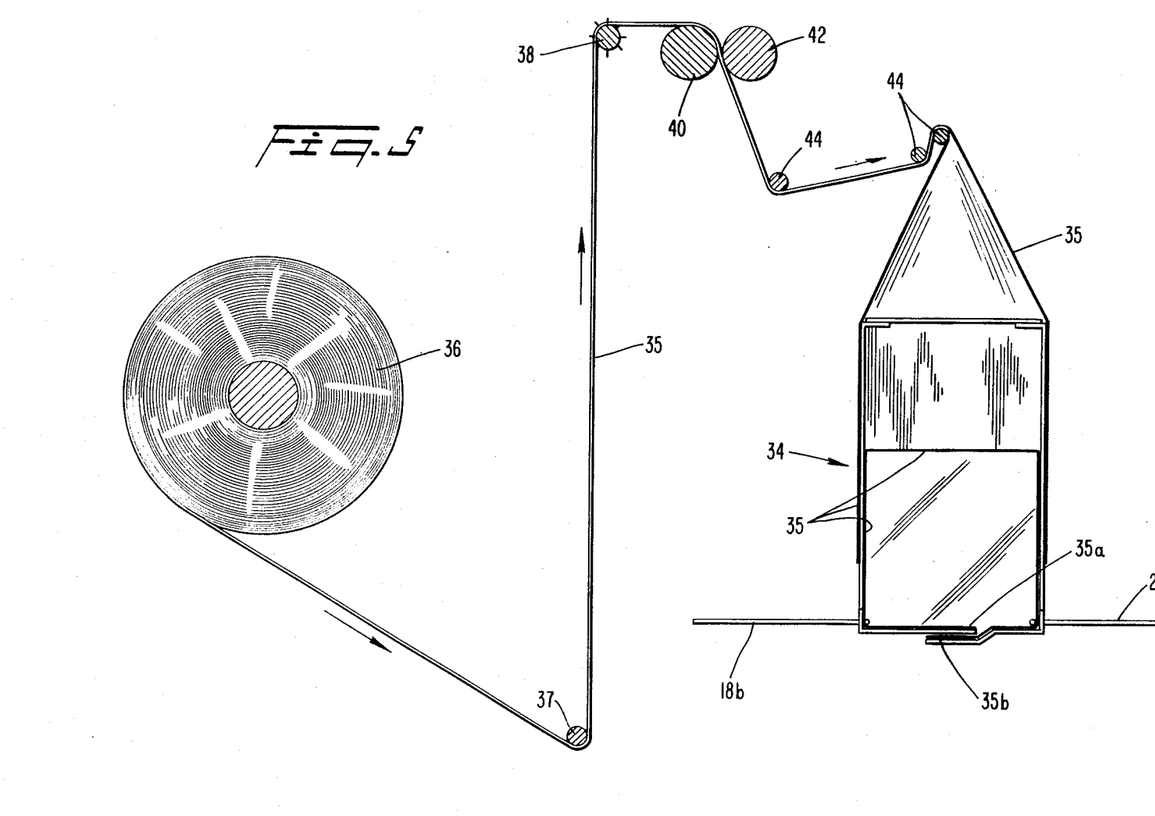
FIG. 5 is a diagrammatic view showing a forming head, a film supply, and the path of travel followed by film from the film supply to the forming head.

Forming head 34 is shown in FIG. 5. Bifolded film 35 is fed from film supply roller 36 through an idler roller 37, a microperf 38, drive rollers 40, 42 and additional idler and tensioning rollers collectively denoted 44. The film is unfolded in the well-known manner by forming head 34. The opposite edges 35a, 35b of film 35 are overlapped at the bottom of forming head 34 as shown, i.e., longitudinally extending edge 35a of the film is disposed in overlying relation to longitudinally extending edge 35b. Thus, when film 35 exits forming head 34, edge 35a will continue to overlap edge 35b. Accordingly, anode 12 bears downwardly upon edge 35a of the film as it exits the forming head; due to the downward offset of anode 12, edge 35b will also be displaced downwardly by anode 12. Thus, anode 12 maintains edges 35a, 35b in their overlapped relation as the static sealing procedure takes place slightly downstream of the forming head.

Figure 6:
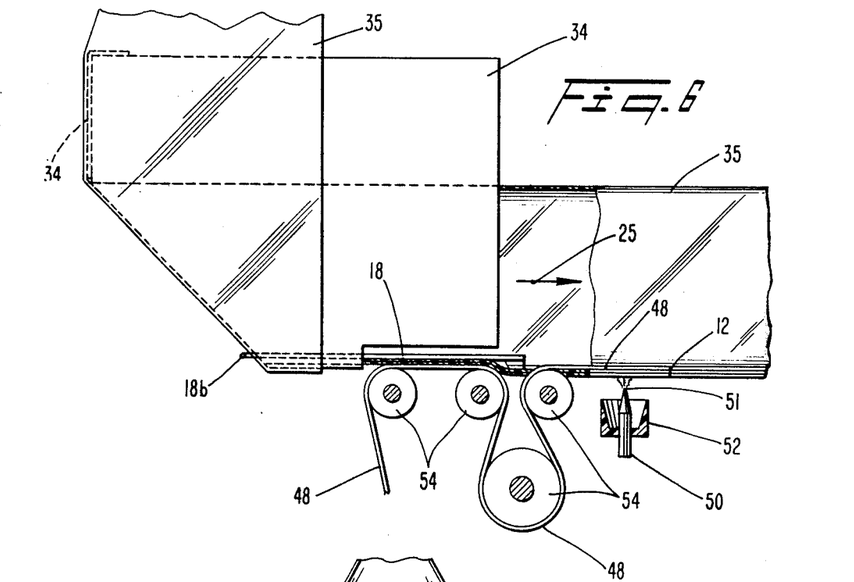
FIG. 6 is a side elevational view of the forming head, the novel anode means of this invention and other related parts.

FIG. 6 best explains why transversely extending parts 18b, 22b of rod members 18, 22 are not disposed interiorly of the film 35 as above mentioned, i.e., film 35 does not extend to the leading edge of the forming head, as shown.

Figure 7:
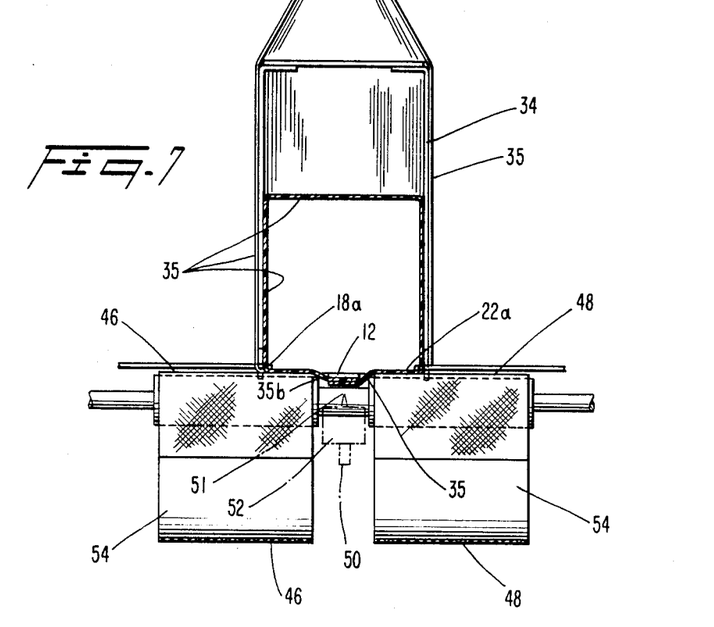
FIG. 7 is a front elevational view of the static seal station of this invention.

FIGS. 6 and 7 show the immediate environment of the anode 12, and it can there be seen that anode 12 rides atop longitudinally extending edge 35a of film 35 and displaces edges 35a and 35b downwardly. A packaged product travelling downstream (out of the paper in FIG. 7) is supported by laterally spaced conveyor belt members 46, 48 as shown. The lateral spacing of the belt members accommodates the anode 12 and the film edges 35a, 35b as shown.

Cathode 50 is also positioned in the space between the belt members 46, 48. It is mounted in a circular mounting member 52 that is fixedly secured by suitable means to the frame of the packaging machine. Cathode 50 may be provided in the form of a nail, as aforesaid, and is electrically coupled to a source of power of sufficient voltage to cause electrons to flow between point 51 of cathode 50 and anode 12 to accomplish the static seal. Clearly, cathode 50 is external to the tubular cavity formed by the film.

Figure 8:
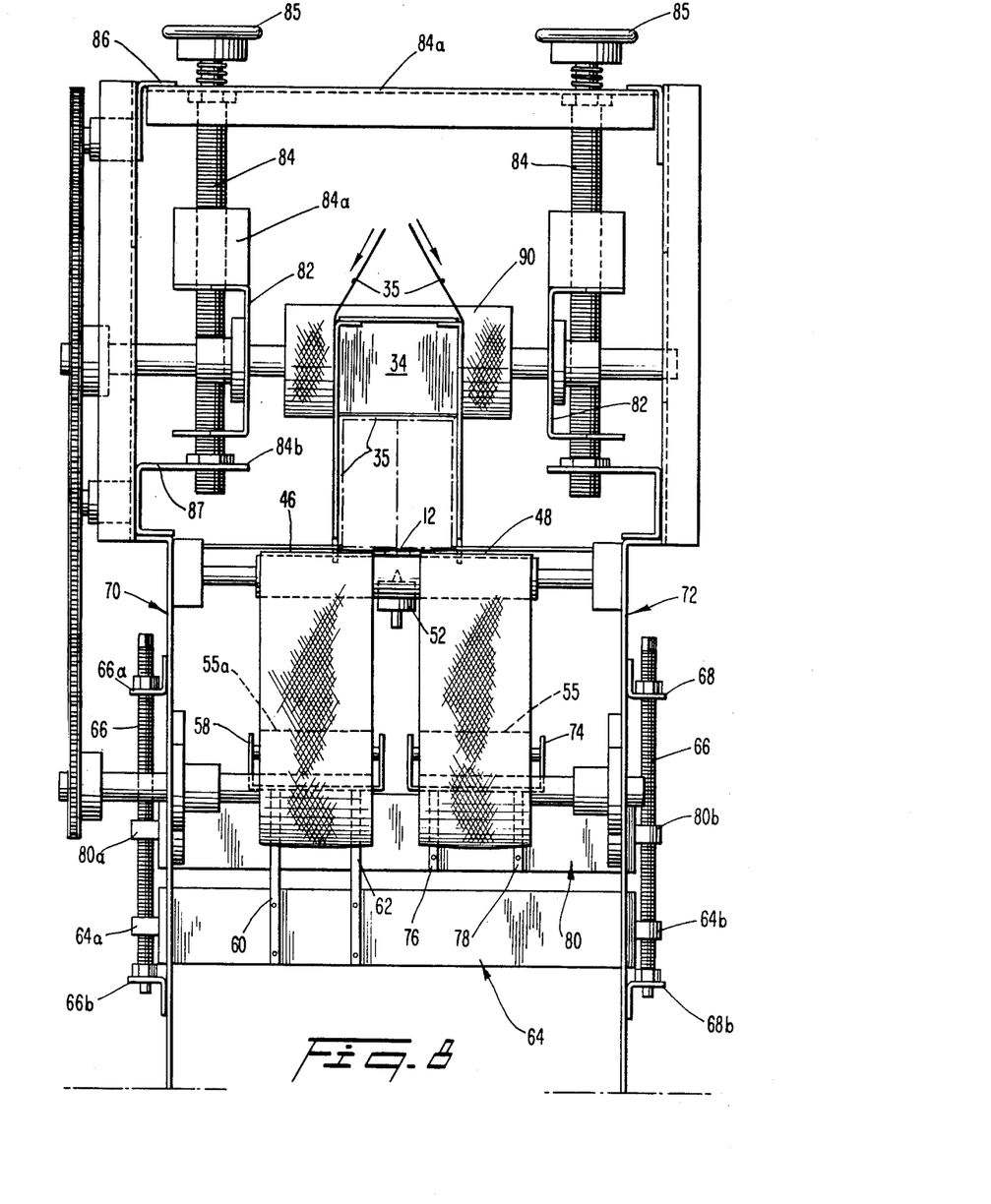
FIG. 8 is a front elevational view of the inventive apparatus similar to FIG. 7, but showing the environment thereof.
Figure 9:
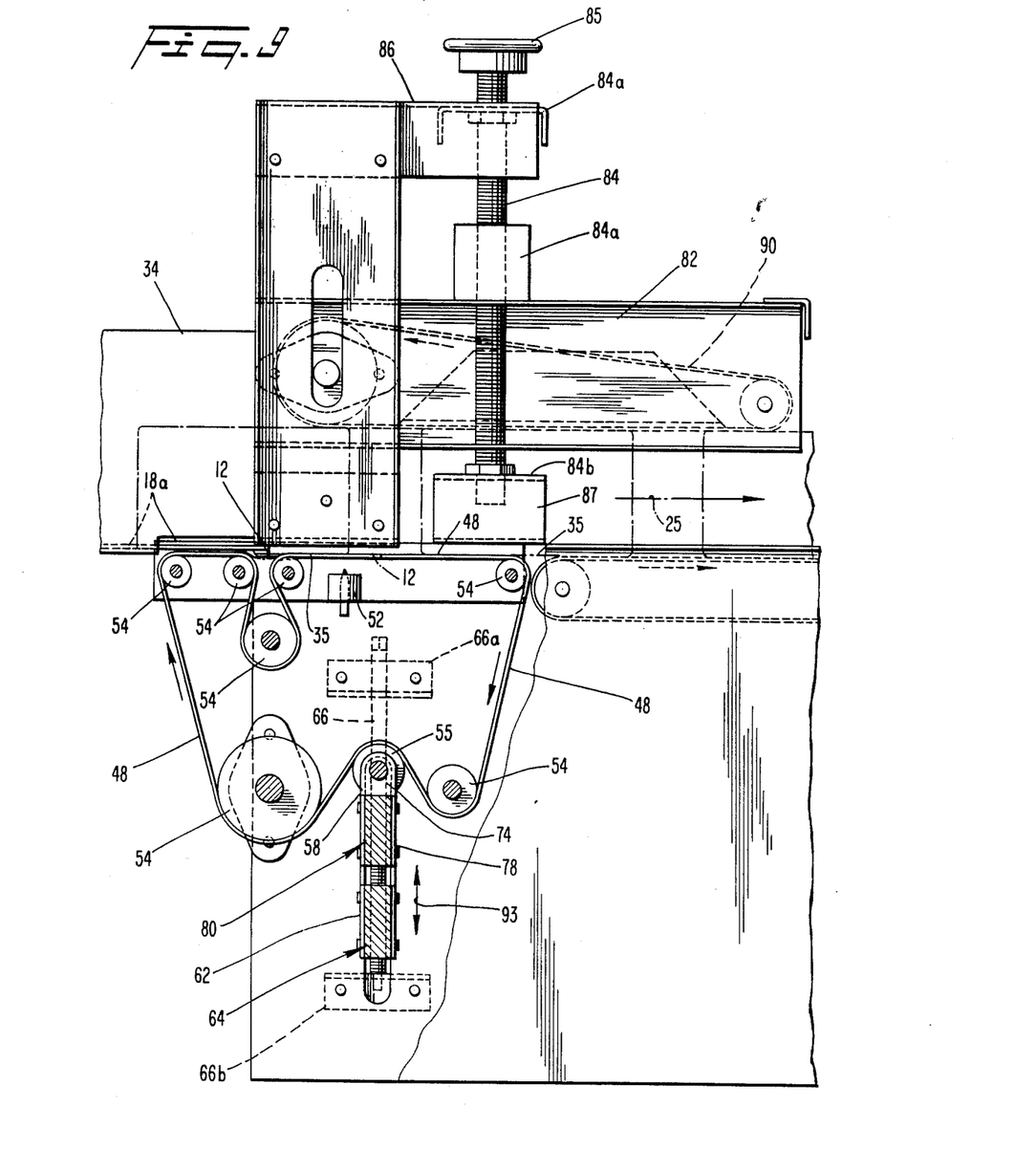
FIG. 9 is a side elevational view of the novel device in its environment.

FIGS. 8 and 9 show how roller members, collectively denoted 54 in FIG. 9, are positioned, it being understood from FIGS. 7 and 8 that there are two transversely spaced sets of such roller members 54. Belts 46 and 48 follow the path of travel as depicted to propel the packages in the direction of directional arrow 25 (FIG. 9). Electrons flowing from the point 51 of cathode 50 will charge anode 12 along its entire extent. FIG. 9 also shows anode 12 and plate 16 positioned downstream of forming head 34 as earlier mentioned. Roller 55 is a belt-tensioning roller; the means for moving it upwardly and downwardly are depicted in FIGS. 8 and 9. Roller 55 is carried by frame 74 which includes leg members 76, 78. Leg members 76, 78 are secured by suitable means to transversely disposed base member 80 having opposite ends 80a, 80b. Each end 80a, 80b is bored as shown and internally threaded to screw threadedly receive an associated externally threaded elongate bolt member 66, 68, each of which is rotatably mounted at its opposite ends to bracket members 66a, 66b and 68a, 68b, respectively. The bracket members are in turn fixedly secured to the main frame members 70, 72 of the machine, respectively. Accordingly, rotation of bolt members 66, 68 effects upward or downward travel of roller 55.

Roller 55a is carried by frame 58 which includes leg members 60, 62 which are in turn fixedly secured to base member 64 having opposite ends 64a, 64b which are internally bored to receive externally threaded bolts 66, 68.

As mentioned earlier, if a package is light, (less than ten pounds), the film and the package could remain stationary while the belt moves. The overhead conveyor belt assembly that bears downwardly on top of light packages to keep them moving is also depicted in FIGS. 8 and 9. FIGS. 8 and 9 also show the means for effecting vertical displacement of the overhead belt.

Frame member 82 is carried by upstanding bolt members 84 the rotation of each of which is accomplished by rotation of its associated head 85; each bolt 84 extends between mounting plates 84a, 84b which are affixed to the machine's frame, as shown, by suitable bracket members 86, 87. Nuts 84a are affixed to frame 82 so that rotation of heads 85 effects vertical travel of frame 82.

The overhead frame member 82 is perhaps better depicted in FIG. 9. It carries overhead belt 90 which rides atop light packages as aforesaid. The other numbered parts shown in FIG. 9 have been previously described.

One of ordinary skill in the art of machine design can now design packaging machines of many differing types that include the static seal station of this invention. The particular structure shown in the accompanying drawings is merely an illustrative embodiment of the invention. Perhaps even more importantly, the particular rectangular shape of anode 12 is not critical, nor is the specific mounting means employed therefor, i.e., one skilled in the art of machine design can, in view of this disclosure, design anodes that have a different appearance than the anode disclosed herein, and can just as easily design different means for mounting and retaining it in its functional position inside the tubular cavity defined by the film. However, all such different in appearance, but substantially similar in operation, modifications of this invention are within the scope of the claims appended hereto.

Since it is apparent that the mechanical structure of the novel apparatus can be changed without departing from the teachings and suggestions of this disclosure, it should be understood that it is the method or process performed by the apparatus that is the essence of this invention. The method includes the steps of forming a film means into a generally tubular shape so that the film defines a generally tubular cavity, causing a first edge of the film means to overlie a second edge thereof, positioning a first electrode means within the tubular cavity in overlying relation to the overlapped edges, positioning a second electrode means without the tubular cavity in spaced relation to the first electrode means, and establishing a potential difference between said electrode means to cause a stream of electrons to travel between the electrodes across the air gap therebetween to thereby impart an electro static charge to the overlapped edges of the film, each edge having a charge of opposite polarity relative to the charge on its opposing edge.

Figure 10:
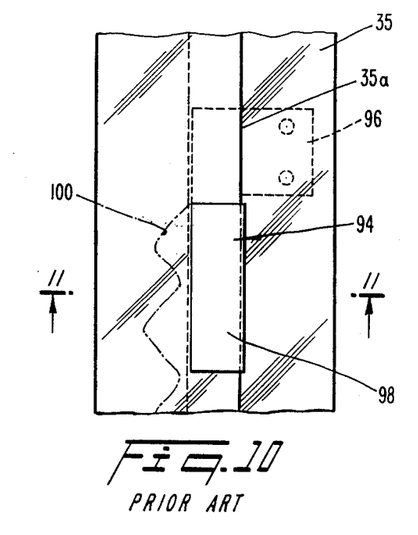
FIG. 10 is a plan view of the return bend anode of the prior art.
Figure 11:
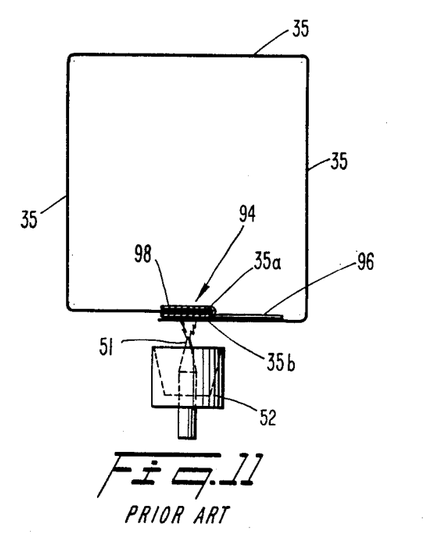
FIG. 11 is a sectional view taken along line 11—11, in FIG. 10.

The scope of the claims that follow can be even better appreciated by making reference to FIGS. 10 and 11, which shows the anode of the prior art. Anode 94 includes a base 96 which remains external to the cavity defined by the film at all times. It further includes a laterally extending arm member that terminates in a return bend 98. Overlying edge 35a of the film 35 is received within the longitudinally extending slot defined by the return bend 98 and underlying edge 35b is positioned in underlying relation to anode 94 as shown. A cathode is positioned downwardly of the longitudinally extending return bend 98 part of anode 94 and the static seal is applied in the manner hereinbefore described.

The depth of the slot limits the amount of overlap between film edges 35a and 35b to about one-half inch (the figures are not drawn to scale). Moreover, when film edge 35a is inserted into the slot, if it is over inserted by even a small amount, the film edge will wrinkle in the manner indicated by line 100 in FIG. 10. The wrinkling not only weakens or defeats the static seal, but the friction between the edge of the film and the longitudinally extending bight of the return bend causes the film to stick or get hung up inside the slot, i.e., the film, once it contacts the bight, does not easily slide therepast.

Figures 12, 13:
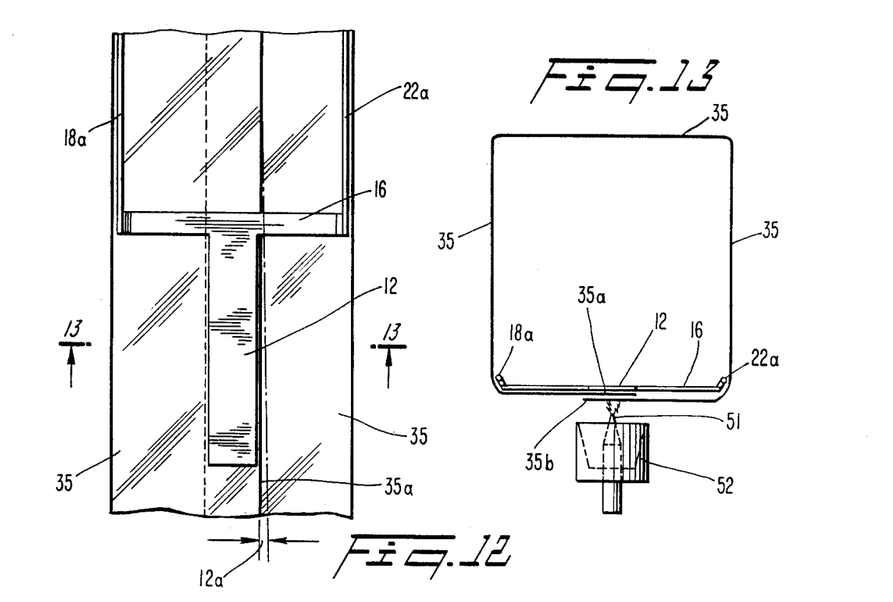
FIG. 12 is a plan view of the novel assembly showing how film misalignments do not affect the static seal.
FIG. 13 is a sectional view taken along line 13—13 in FIG. 12.

The novel anode 12, being disposed entirely within the tubular cavity defined by the film, eliminates the return bend in its entirety. Thus, the amount of overlap can be increased to two inches to provide a very strong static seal. Moreover, the film cannot hang up on anything, since the anode is of flat plate construction. Accordingly, costly down time attributed to the conventional return bend anode is eliminated. As shown in FIGS. 12 and 13, any film misalignment or play, indicated as at 12a, has no adverse effect upon the operation of the novel anode 12. FIG. 13 shows how the overlap can be two inches or so.

The system has been designed so that nothing obstructs the flow of the product through the machine. The recessed anode and its mounting means elegantly fulfill the design criteria.

Clearly, this invention pioneers the art of static seal anodes that are disposed inside the cavity formed by film wrapped around packages by packaging machines. Thus, the claims that follow are entitled to liberal and broad construction, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device that applies an electrostatic charge to overlapping edges of flexible film of the type used to wrap packages, said film defining a generally tubular cavity means, comprising:

An electrode means disposed wholly internally of said cavity means; and mounting means for positioning said electrode means wholly within said cavity means defined by said flexible film so that the amount of overlap is unrestricted.

2. The device of claim 1, wherein said electrode means is disposed in contacting relation to the overlapped edges of said film.

3. The device of claim 2, wherein said film edges overlap a longitudinally extending region at the bottom of said cavity means, and wherein said electrode means is disposed in overlying, contacting relation to said region.

4. The device of claim ,3, further comprising conveyor means for transporting packages wrapped in said film past said electrode means.

5. The device of claim 4, wherein said electrode means is positioned at least slightly downward of a plane occupied by the bottom wall of a package being transported past said device so that film wrapped about said package is deflected at least slightly downwardly by said electrode means as said package travels therepast.

6. The device of claim 5, wherein said electrode means is a generally flat, planar in configuration member so that it does not snag the film passing thereunder.

7. The device of claim 6, where the amount of overlap of the film edges is about two inches.

8. The device of claim 6, further comprising a second electrode means disposed downward of said first-mentioned electrode means, in spaced relation thereto so that an air gap exists therebetween, said second electrode means being positioned wholly external to the cavity means defined by said film.

9. The device of claim 8, wherein said conveyor means includes a pair of conveyor members disposed in parallel, transversely spaced apart relation to one another, there being a longitudinally extending space therebetween.

10. The device of claim 9, wherein said second electrode means is positioned between said conveyor members, and wherein said first-mentioned electrode means is positioned in a substantially horizontal plane that is generally parallel to but spaced downward from a plane coincident with a top, package-supporting surface of said conveyor members, said downward portion of said first-mentioned electrode means placing it in the longitudinally extending space between said conveyor members.

11. The device of claim 10, further comprising a rotatably mounted supply roll of film, and a tunnel-like forming head member that forms said film into a generally tubular configuration with longitudinally extending, overlapped edges along the bottom of said tubular configuration.

12. The device of claim 11, wherein said first-mentioned electrode means is disposed externally of said forming head member.

13. The device of claim 12, further comprising holding means for holding said first-mentioned electrode means in a fixed position so that it is not displaced in the direction of package travel when packages travel past it.

14. The device of claim 13, wherein said holding means includes a mounting plate member disposed transverse to the direction of package travel, said mounting plate member being disposed within said cavity means and without said forming head member.

15. The device of claim 14, wherein said holding means further includes a pair of elongate, thin rod members fixedly secured to opposite ends of said mounting plate member, said rod members being disposed near a bottom wall of said forming head member adjacent opposite side walls thereof and said rod members bent outwardly away from said forming head member at a package-receiving end thereof so that said first-mentioned electrode means cannot travel in the direction of said packages.

16. The device of claim 15, further comprising means for independently adjusting the tension of said conveyor members.

17. The device of claim 16, further comprising an overhead conveyor member that bears against a top wall of packages supported by said first-mentioned conveyor members so that light in weight packages are propelled thereby.

18. The device of claim 17, further comprising means for vertically adjusting the position of said overhead conveyor member.

19. A device that imparts a static seal to flexible film within which packages are wrapped, comprising:
a hollow forming head means for forming said film into a generally tubular configuration;
a generally tubular cavity means being defined by said film when so formed;
a first longitudinally extending edge region of said film being disposed in overlying relation to a second longitudinally extending edge region of said film when said film is formed into said generally tubular configuration;
a first electrode means disposed in overlying, abutting relation to said first edge region;
a second electrode means disposed in underlying, spaced apart relation to said second edge region; and
said first electrode means being disposed in its entirety within said generally tubular cavity means defined by the film;
whereby a stream of electrons flowing between said first and second electrode means imparts an electrostatic charge of a first polarity to said first edge region and an electrostatic charge of a second polarity to said second edge region so that said first and second edge regions cling tightly to one another to form an electrostatic seal that prevents inadvertent unwrapping of said film from a package.

20. The device of claim 19, wherein said first electrode means is mounted interiorly of said tubular cavity means and exteriorly of said forming head means, and wherein said second electrode means is mounted exteriorly of said tubular means and exteriorly of said forming head means in downwardly spaced relation to said first electrode means.

21. A method for forming an electrostatic seal between overlapping edges of a flexible film means, comprising the steps of:
shaping a flexible film means into a generally tubular form so that opposite edges of said film means are disposed in overlapping relation to one another;
positioning all of the structure of a first electrode means wholly within a tubular cavity means defined by said film means;
mounting said first electrode means so that it bears against the overlapped edges of said film means;
positioning a second electrode means externally of said tubular cavity means; and
establishing a potential difference between said first and second electrode means so that electrons flow across an air gap that separates said first and second electrode means.

* * * * *